United States Patent [19]

Salomon et al.

[11] Patent Number: 5,239,914
[45] Date of Patent: Aug. 31, 1993

[54] MACHINE FOR PREPARING BREWED BEVERAGES

[75] Inventors: Thomas Salomon, Schloss-Holte; Hans-Jürgen Slomka, Minden, both of Fed. Rep. of Germany

[73] Assignee: Melitta Haushaltsprodukte GmbH & Co. Kommanditgesellschaft, Minden, Fed. Rep. of Germany

[21] Appl. No.: 611,742

[22] Filed: Nov. 13, 1990

[30] Foreign Application Priority Data

Nov. 18, 1989 [DE] Fed. Rep. of Germany ....... 3938446

[51] Int. Cl.$^5$ ............................................. A47J 31/00
[52] U.S. Cl. ........................................ 99/285; 99/295; 99/307
[58] Field of Search ............... 99/295, 306, 285, 300, 99/302 R, 304, 305, 307, 316, 317; 426/433; 73/313, 319, 320, 321, 322, 323; 116/128; 206/486, 806; 220/482; 248/223.4, 224.1, 224.2, 224.3, 225.2, 311.2

[56] References Cited

U.S. PATENT DOCUMENTS

| | | | |
|---|---|---|---|
| 3,848,563 | 11/1974 | Brown | 99/342 |
| 3,915,189 | 10/1975 | Holbrook et al. | 248/223.4 |
| 4,328,740 | 5/1982 | McDonough et al. | 99/285 |
| 4,667,587 | 5/1987 | Wunder | 99/295 |
| 4,704,954 | 11/1987 | Mollenhoff | 99/295 |
| 4,735,332 | 4/1988 | Thumser | 15/260 |
| 4,793,246 | 12/1988 | Barradas | 99/307 |
| 4,811,657 | 3/1989 | Rixen | 99/295 |
| 4,911,067 | 3/1990 | Oppermann | 99/295 |
| 4,970,896 | 11/1990 | Larson et al. | 73/320 |

FOREIGN PATENT DOCUMENTS

1215026 11/1959 France ................. 116/228

Primary Examiner—Harvey C. Hornsby
Assistant Examiner—Reginald L. Alexander
Attorney, Agent, or Firm—Spencer, Frank & Schneider

[57] ABSTRACT

A machine for preparing brewed beverages includes a housing; a collecting vessel station disposed in the housing for receiving a brewed beverage collecting vessel thereon; a brewing water supplying station disposed in the housing above the collecting vessel station; a filter vessel for receiving a filter and a beverage material to be extracted therein; and a filter vessel holder for vertically receiving the filter vessel therein. The filter vessel holder is pivotally attached to the exterior of the housing for rotation between a brewing position in which the filter vessel received therein is substantially disposed between the brewing water supplying station and the collecting vessel station, and a filling position in which the filter vessel received in the filter vessel holder is spaced from the interior of the housing.

10 Claims, 3 Drawing Sheets

5,239,914

MACHINE FOR PREPARING BREWED BEVERAGES

CROSS-REFERENCE TO RELATED APPLICATION

This application claims the priority of Federal Republic of Germany Application No. P 39 38 446.2, filed Nov. 18th, 1989, which is incorporated herein by reference.

BACKGROUND OF THE INVENTION

This invention relates to a machine for preparing brewed beverages, the machine including a housing with a filter vessel which is rotatable between a brewing water supply station positioned above a support for a beverage pot and an external filling position.

In prior art machines of this type the filter vessel was arranged so as to be rotatable in the machine housing, and the filter vessel was essentially articulated directly to the interior of the machine housing. This results in considerable space problems as concerns interfering components in the machine, and also prevents positioning of the filter vessel on the outside of the machine. It is desirable to have a position for the filter vessel located so far from the exterior of the machine that the filter paper and the material to be extracted can be easily and accurately inserted in the filter vessel. This has not been possible in prior art machinery.

SUMMARY OF THE INVENTION

It is therefore an object of the present invention to provide a brewing machine of this type that has problem-free, collision-free pivoting of the filter vessel into and out of the interior of the machine for eliminating problems with respect to the filling process. It is a further object of the invention to have the means provided for solving the above-described problems perform multiple functions thus enhancing the use of the machine, and also improving the aesthetic appearance.

This object and others to become apparent as the specification progresses, are accomplished by the invention, according to which, briefly stated, a holder for the filter vessel is rotatably mounted on an outer longitudinal edge of the housing exterior, with the filter vessel being vertically insertable into the holder.

The placement of the filter vessel holder at the outer longitudinal edge of the housing results in a significant freedom of design for the support as well as the holder itself, thereby precluding collisions with other machine components. Given that the pivot bearing region of the filter vessel holder is placed as far outside as possible with respect to the housing, and given that the holder itself must be relatively large, the location of the pivot, coupled with the configuration of the filter vessel holder, results in a problem-free manipulation in space for the filter vessel while being placed into the holder, and results in an optimal location of the filling position for the filter vessel within the machine. The filter vessel holder serves as a covering plate for the adjacent area of the housing. This covering plate configuration makes it possible to utilize the open position of the holder, in which the filter vessel is in the filling position, to render easily visible the devices and the displays that are important for a proper operation and operator performance; yet, during the operating phase of the machine and during non-use, these components are covered by the vessel holder in order to enhance the aesthetic appeal of the machine.

DESCRIPTION OF THE PREFERRED EMBODIMENT

Figure 1:
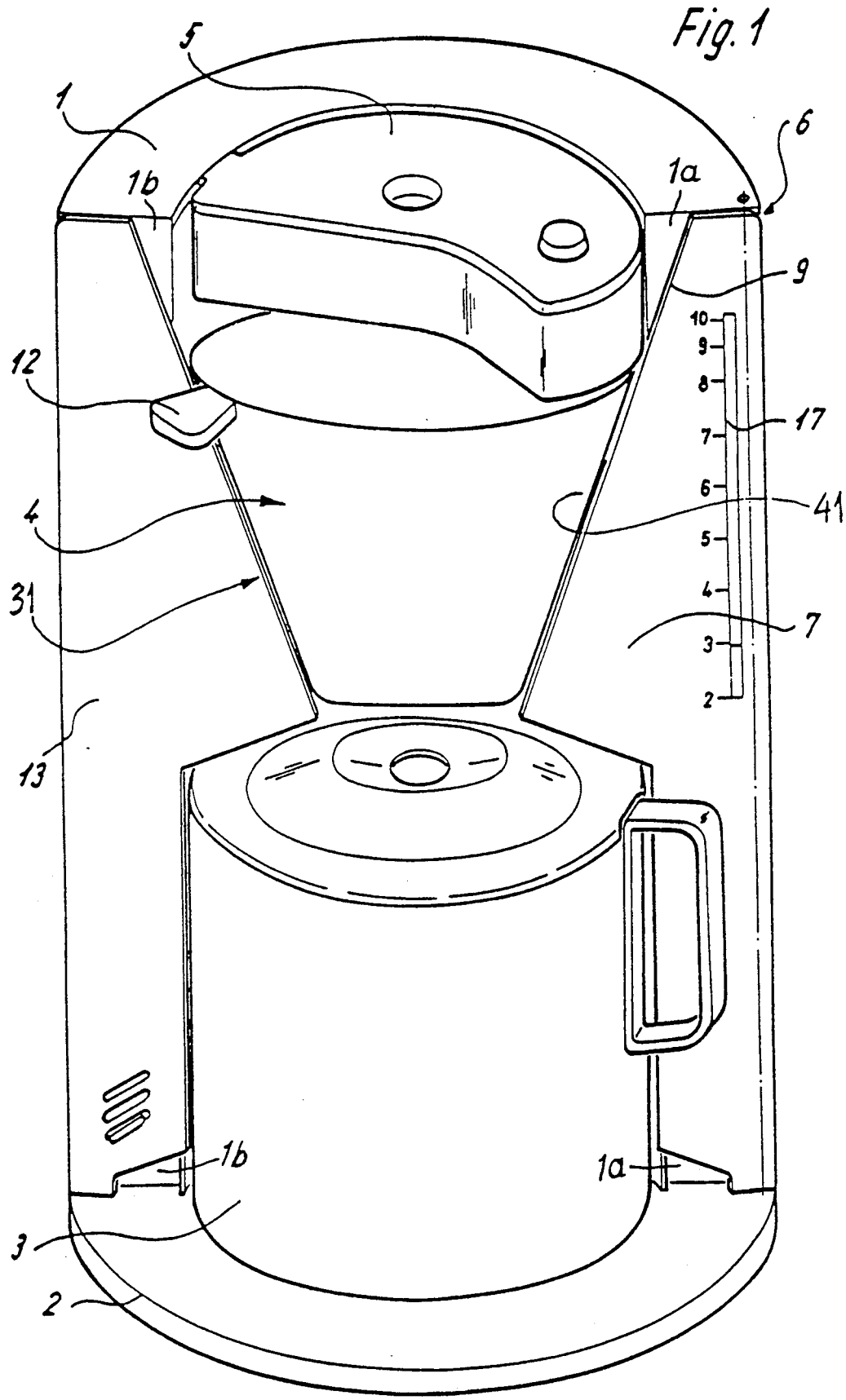
FIG. 1 is a perspective view of a preferred embodiment of the invention with the holder for the filter vessel pivoted into the brewing water supply station.

Turning to FIG. 1, the machine for preparing brewed beverages, such as coffee, shown therein, has a housing 1 shaped as a cylindrical tube segment, for example, a half tube having axially parallel, longitudinal end faces 1a and 1b. Housing 1 defines a free central receiving area delimited on the underside by a conventional heatable bottom plate 2 which is the support location for a collection vessel (such as a coffee pot) 3 receiving the brewed beverage. In the operating position, a filter vessel 4 is placed above collection vessel 3 and below a brewing water dispenser 5.

Figure 2:
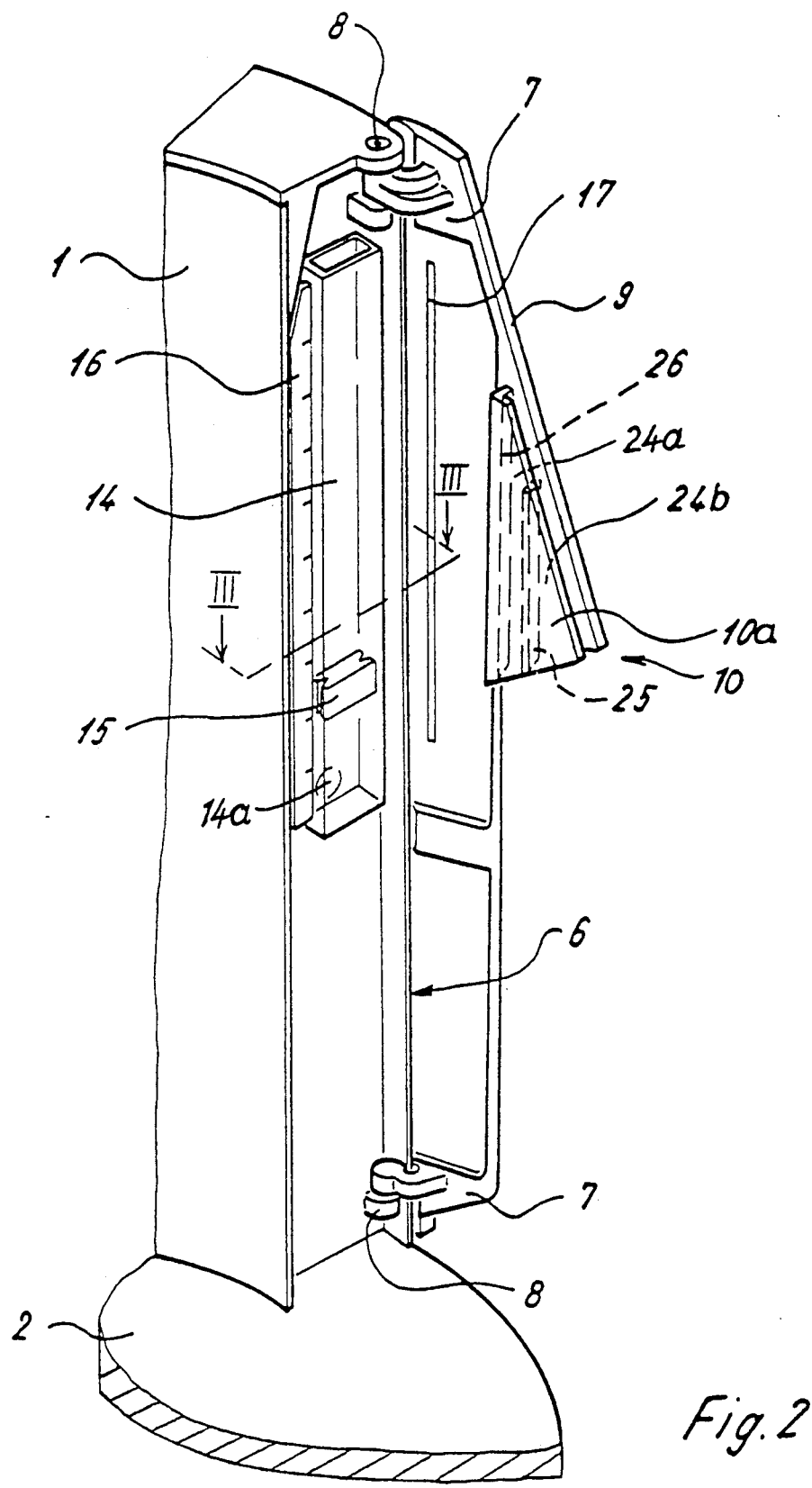
FIG. 2 is a fragmentary perspective view of the preferred embodiment of FIG. 1 with the holder for the filter vessel pivoted outwardly.

In order to pivot filter vessel 4 out of the operating position shown in FIG. 1, a holder 7 is rotatably mounted at an outer longitudinal edge 6 of the end face 1a of housing 1. As shown in FIG. 2, holder 7 is preferably supported by means of hinges 8 in the vicinity of the upper and lower end of outer longitudinal edge 6.

Holder 7 includes an inclined edge 9 corresponding to the slope of the conical face 41 of filter vessel 4. A plug-in socket 10, described in greater detail below, is provided in the region of sloped edge 9. Filter vessel 4, in order to be inserted into the machine and held in a vertical operating position, is provided with a corresponding plug-in member 11 described in greater detail below.

As can be seen in FIGS. 1 and 2, the cooperating components 10, 11 enable filter vessel 4, when inserted into holder 7, to be pivoted without difficulty, for example by means of a handle 12 provided on the vessel 4, into the brewing water supply position shown in FIG. 1, or to be pivoted outwardly, away from the bulk of the machine. In such an outwardly pivoted position, a filter paper may be replaced and the filter vessel 4 may be charged with the material to be extracted, without the interference of other machine components. The described support of the holder 7 on the outer longitudinal edge 6 of housing 1 leaves great design freedom, so that any possible collisions with operational components of the machine can be avoided.

A wall plate 13 disposed face-to-face on the end face 1b of the annular chamber formed by housing 1 is also given an inclined edge 31 having a slope corresponding to that of filter vessel 4 so that, in the operating position (see FIG. 1), a harmonious, pleasing visual impression of a closed machine construction results.

Rotatably mounted holder 7 for filter vessel 4 performs multiple functions. Thus, given its geometric configuration, holder 7 also serves as a cover plate for the annular chamber of housing 1 where the chamber borders the interior of the outer longitudinal edge 6. The dimensions of holder 7 are selected so that, in the closed (inwardly pivoted) operating position of FIG. 1, holder 7 substantially covers the end face 1a of the housing 1.

As a further feature, operational elements whose good visibility is advantageous for charging and servicing the machine are accommodated in those portions of the annular chamber of housing 1 which are hidden by holder 7 when functioning as a covering plate in the closed position. This good visibility is afforded by pivoting holder outwardly into its open position.

As a particularly expedient feature, a tubular fill level indicator 1 for gauging the amount of water required is provided in the annular chamber section covered by holder 7 in its closed position. The tubular fill level indicator 14, which includes a float member 15 has a detailed scale 16 on which the required amounts are accurately calibrated in cups and/or liters. In its bottom region the fill level indicator 14—which is open at its top—has an aperture 14a which communicates with a non-illustrated water reservoir accommodated in the housing 1. In this manner water from the reservoir fills the tubular fill level indicator 14 and will have a level corresponding to the water level in the reservoir. The rising and sinking of the water level in the indicator 14 will cause corresponding up and down movements of the float 15.

As it is of advantage to be able to determine during the operating phase how many cups have already been brewed or how many cups the machine is still set to brew, according to a further feature a display zone 17 is formed in the holder 7. Display zone 17 permits a partial view of float member 15 as it moves along a given path. This may be accomplished, for example, by making the viewing side of holder 7 of a translucent pane (such as a milk glass) having small strip-shaped transparent scale zones which also may have associated transparent numerical ranges. If float member 15 is colored, for example, in a luminescent hue, a simple, aesthetically pleasing indicator results, with the optical appearance of such a display simulating a digital display at little expense.

Figure 3:
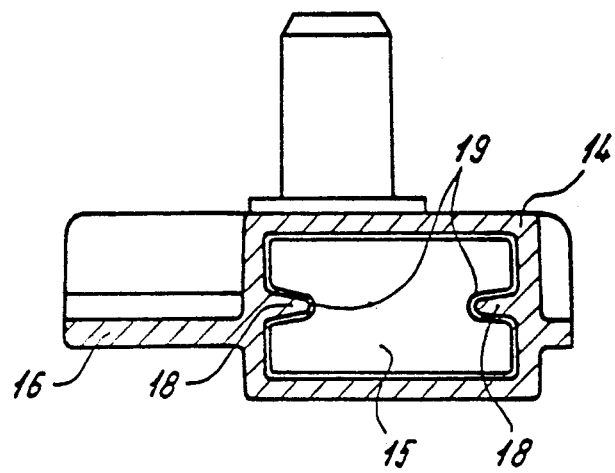
FIG. 3 is a partial sectional view taken along line III—III of FIG. 2.

Turning to FIG. 3, proper guidance of float member 15 in the tubular fill level indicator can be ensured by providing the latter with a profile including guide ribs 18 projecting on two mutually facing interior sides and extending from top to bottom along the path of float member 15. On its corresponding sides, float member 15 has guide grooves 19 which cooperate with guide ribs 18.

Figure 4:
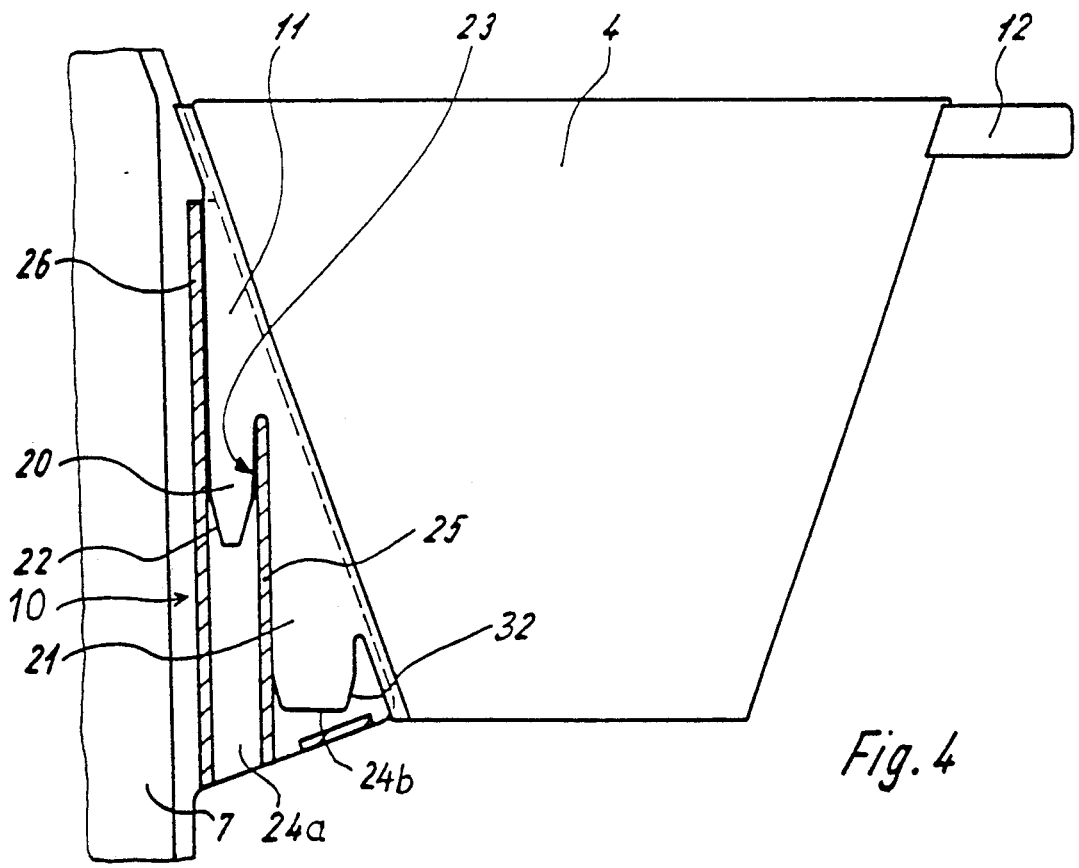
FIG. 4 is an enlarged elevational view of one part of the structure shown in FIG. 1.

A preferred plug-in device for plugging filter vessel 4 into holder 7 is shown in detail in FIG. 4. Plug-in member 11 projecting from filter vessel 4 includes two parallel-extending plug-in pins 20 and 21 which are offset in height relative to one another and which are slightly conical in their active zones; that is, the lower ends of both plug-in pins 20,21 are provided with insertion slopes 22,32 for easing insertion. Plug-in pins 20 and 21 are offset in height relative to one another and define a conical receiving groove 23 between them.

Plug-in socket 10 which is provided in holder 7 and which cooperates with pins 20, 21 is essentially composed of a recesses 24a, 24b for plug-in member 11. The recess 24a is bounded by the holder 7, an upwardly projecting center supporting wall 25, a rear wall 26 and a panel 10a extending parallel to and spaced from a wall face of the holder 7. The recess 24b which extends parallel to the recess 24a is bounded by the holder 7, the panel 10a and the center wall 25. After insertion into receiving groove 23, supporting wall 25 enters between plug-in pins 20 and 21 of filter vessel 4. The plug-in connection in the vertical position of the filter is thus brought about in that plug-in pins 20 and 21 of the filter vessel engage supporting wall 25 on both sides, with the upper edge of supporting wall 25 being supported at the bottom of receiving groove 23. Advisably a small amount of play is provided in this plug-in connection to ensure insertion and removal without jamming. A secure connection results as plug-in pins 20 and 21 of filter vessel 4 are received in the recesses 24a and 24b and are reliably supported at the side faces of supporting wall 25 over which they extend and at the rearward wall 26.

It will be understood that the above description of the present invention is susceptible to various modifications, changes, and adaptations, and the same are intended to be comprehended within the meaning and range of equivalents of the appended claims.

What is claimed is:

1. A machine for preparing brewed beverages, comprising:
   a housing in the shape of a tube segment having an interior, an exterior, a first longitudinal end face and a second longitudinal end face;
   a collecting vessel station disposed in said housing for receiving a brewed beverage collecting vessel thereon;
   a brewing water supplying station disposed in said housing above said collecting vessel station;
   a conical filter vessel for receiving a filter and a beverage material to be extracted therein;
   a filter vessel holder means for vertically receiving said filter vessel therein, said filter vessel holder means being pivotally attached to said exterior of said housing along an outer edge of said first longitudinal end face for rotation between a brewing position in which said filter vessel received therein is substantially disposed between said brewing water supplying station and said collecting vessel station, and a filling position in which said filter vessel received in said filter vessel holder is spaced from said interior of said housing; said filter vessel holder means having a sloped edge extending adjacent and parallel to a conical side wall of the conical filter vessel; and
   a wall plate rigidly disposed face-to-face on and along said second longitudinal end face; said wall plate having a sloped edge extending adjacent and parallel to said conical side wall of the conical filter vessel when said vessel is in said brewing position.

2. A machine as defined in claim 1, wherein said filter vessel holder means includes a cover plate; further wherein a brewing water volume display means is disposed in said interior of said housing for displaying the volume of beverage brewed and able to be brewed, said display means is covered by said cover plate when said filter vessel holder means is in said brewing position, and said display means is uncovered when said holder means is in said filling position.

3. A machine as defined in claim 1, wherein said filter vessel holder means includes a cover plate; further wherein a tubular fill level indicator is disposed in said interior of said housing, said tubular fill level indicator includes a float member movable along a path relative to said tubular fill level indicator for indicating the volume of water in the apparatus; and a display zone is disposed in said cover plate for permitting a partial view of said float member along its path of movement relative to said tubular fill level indicator.

4. A machine as defined in claim 3, wherein said tubular fill level indicator includes two facing interior walls; further comprising a guide rib on each said two facing interior walls; and a guide groove disposed on respective sides of said float member for slidably receiving each one of said guide ribs.

5. A machine for preparing brewed beverages, comprising:
a housing having an interior and an exterior;
a collecting vessel station disposed in said housing for receiving a brewed beverage collecting vessel thereon;
a brewing water supplying station disposed in said housing above said collecting vessel station;
a conical filter vessel for receiving a filter and a beverage material to be extracted therein; and
a filter vessel holder means for vertically receiving said filter vessel therein, said filter vessel holder means being pivotally attached to said exterior of said housing for rotation between a brewing position in which said filter vessel received therein is substantially disposed between said brewing water supplying station and said collecting vessel station, and a filling position in which said filter vessel received in said filter vessel holder is spaced from said interior of said housing; said filter vessel holder means having a sloped edge extending adjacent and parallel to a conical side wall of the conical filter vessel;
a plug-in socket affixed to said sloped edge and having a rear wall, a center supporting wall extending parallel to and spaced from said rear wall and a panel extending parallel to and spaced from said filter vessel holder means; said panel, said filter vessel holder means, said center supporting wall and said rear wall defining a first recess; and said panel, said filter vessel holder means and said center panel defining a second recess extending parallel to said first recess and being separated from said first recess by said center panel; and
a plug-in member affixed to said conical side wall on said conical filter vessel; said plug-in member including first and second parallel-extending, spaced plug-in pins defining a receiving groove therebetween; said first and second plug-in pins being received in said first and second recesses, respectively and said center supporting wall of said plug-in socket being received in said receiving groove.

6. A machine as defined in claim 5, wherein said filter vessel holder means includes a cover plate; further wherein a brewing water volume display means is disposed in said interior of said housing for displaying the volume of beverage brewed and able to be brewed, said display means is covered by said cover plate when said filter vessel holder means is in said brewing position, and said display means is uncovered when said holder means is in said filling position.

7. A machine as defined in claim 5, wherein said filter vessel holder means includes a cover plate; further wherein a tubular fill level indicator is disposed in said interior of said housing, said tubular fill level indicator includes a float member movable along a path relative to said tubular fill level indicator for indicating the volume of water in the apparatus; and a display zone is disposed in said cover plate for permitting a partial view of said float member along its path of movement relative to said tubular fill level indicator.

8. A machine as defined in claim 7, wherein said tubular fill level indicator includes two facing interior walls; further comprising a guide rib on each said two facing interior walls; and a guide groove disposed on respective sides of said float member for slidably receiving each one of said guide ribs.

9. A machine as defined in claim 5, wherein said first and second plug-in pins are offset in height relative to each other.

10. A machine as defined in claim 5, wherein each one of said first and second plug-in pins has a substantially conical free end.

* * * * *